No. 804,745. PATENTED NOV. 14, 1905.
J. S. LOCKWOOD.
ELECTRICALLY CONTROLLED FLUID PRESSURE RAILWAY BRAKE.
APPLICATION FILED FEB. 5, 1904. RENEWED MAR. 24, 1905.
5 SHEETS—SHEET 4.

WITNESSES
R E Hamilton
M C Long

INVENTOR
John S. Lockwood
By Warren L. House
His Attorney.

UNITED STATES PATENT OFFICE.

JOHN S. LOCKWOOD, OF KANSAS CITY, MISSOURI.

ELECTRICALLY-CONTROLLED FLUID-PRESSURE RAILWAY-BRAKE.

No. 804,745. Specification of Letters Patent. Patented Nov. 14, 1905.

Application filed February 5, 1904. Renewed March 24, 1905. Serial No. 251,846.

*To all whom it may concern:*

Be it known that I, JOHN S. LOCKWOOD, a citizen of the United States, residing at Kansas City, in the county of Jackson and State of Missouri, have invented new and useful Improvements in Electrically-Controlled Fluid-Pressure Railway-Brakes, of which the following is a specification.

My invention relates to improvements in electrically-controlled fluid-pressure railway-brakes.

My invention relates particularly to fluid-pressure brake mechanism, such as the "Westinghouse" or "New York" air-brake systems, which employ on each car an auxiliary reservoir for the braking fluid and control the passage of air to and from the brake-cylinder, which is supplied from the auxiliary reservoir, by means of a "triple" valve.

In long trains of cars it takes considerable time for the engineer to actuate the triple valves of all the cars; and it is the object of my invention to provide means by which the engineer may instantly apply or release the brakes without utilizing the triple valves. It provides means by which when a triple valve becomes inoperative on any car the valve may be cut out and the brakes of the car operated without it.

My invention provides each car with an electromagnetic mechanism which controls the passage of air from the auxiliary reservoir to the brake-cylinder and the exhausting of the brake-cylinder, each electromagnetic mechanism being disposed in electric circuits connecting the cars and the engine and means being provided the engineer by which he can so control the currents passing in said circuits as to instantly set, hold, or release all the brakes instantly either with the use of the triple valves of the cars or without them.

My invention provides, further, a novel arrangement of said electric circuits and also a novel coupling by which the circuit of one car is connected with the circuit of the next car.

Other novel features are hereinafter fully described and claimed.

In the accompanying drawings, which illustrate my invention.

Similar characters of reference indicate similar parts.

1 indicates the brake-cylinder, 2 the auxiliary reservoir, and 3 an ordinary triple valve, such as are used with the well-known Westinghouse or New York air-brake systems.

4 denotes the ordinary train-pipe for applying air to the auxiliary reservoir by way of the triple valve in the manner common with such mechanisms.

5 denotes the main line of piping, by means of which the branch train-pipes 4 are supplied with air from the main reservoir of the engine.

Figure 1:
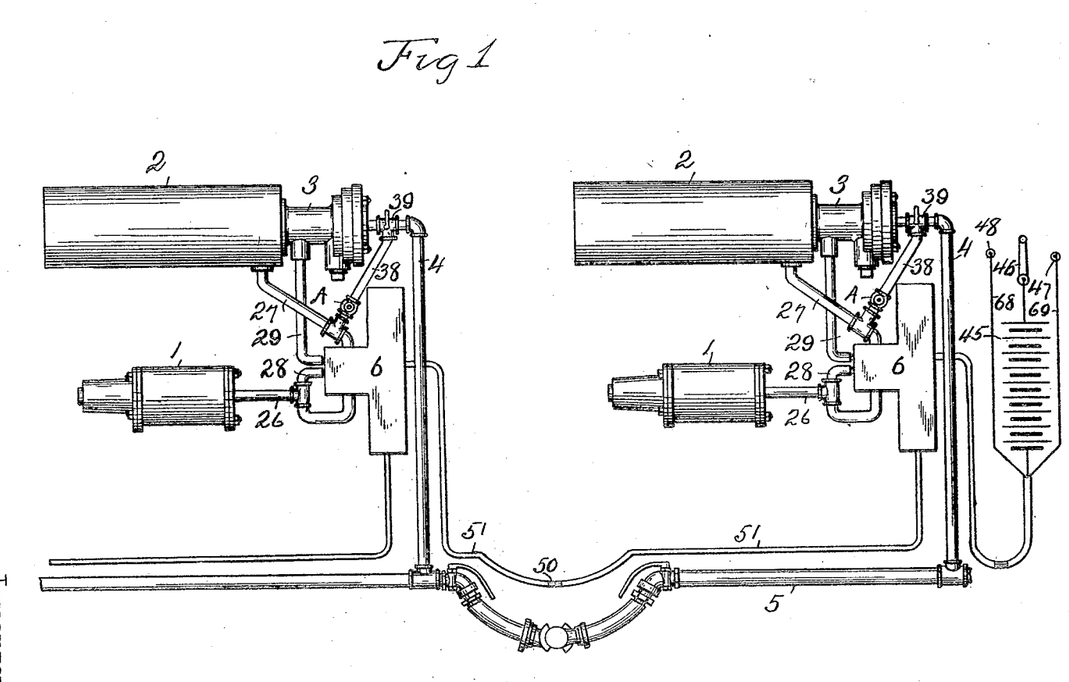
Figure 1 is a plan view showing the braking mechanisms of two cars connected together and also a partial diagram of the controlling-circuit.
Figures 2, 5:
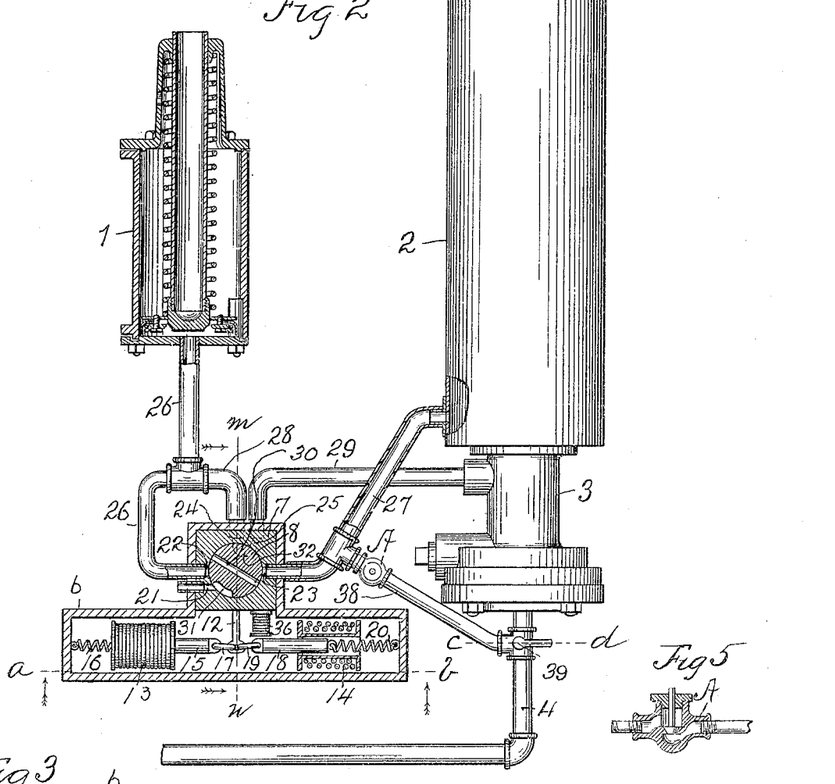
Fig. 2 is a view of the brake mechanism of one car, the mechanism being shown partly in plan and partly in horizontal section. In this view the magnetically-controlled valve is shown in the position in which the triple-valve mechanism is connected with the brake-cylinder so that the brakes may be controlled by the triple valve.
Fig. 5 is a vertical central sectional view of the check-valve A.
Figure 3:
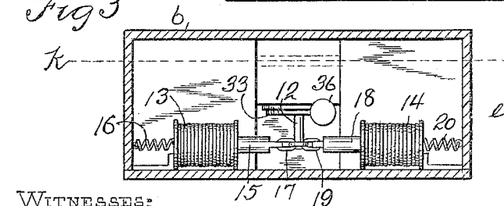
Fig. 3 is a vertical sectional view taken on the dotted line $ab$ of Fig. 2.
Figures 7, 8, 9:
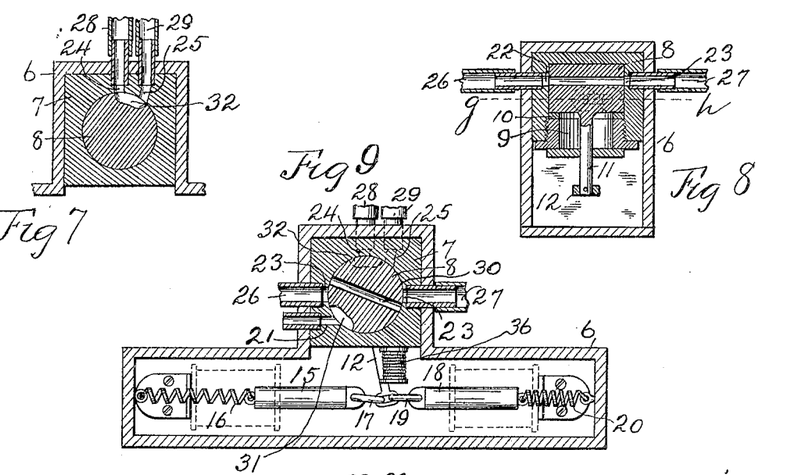
Fig. 7 is a sectional view taken on the dotted line $gh$ of Fig. 8.
Fig. 8 is a vertical sectional view taken on the dotted line $ij$ of Fig. 10.
Fig. 9 is a horizontal sectional view taken on the dotted line $kl$ of Fig. 3, the magnetically-controlled valve being shown in the neutral position in which all the ports are closed and the valve prevented from rocking to its normal position, shown in Fig. 2, by the electrically-controlled mechanism described hereinafter. This view is similar to that shown in Fig. 2, the triple valve, auxiliary reservoir, brake-cylinder, and some of the other parts not being shown, the solenoid helices being shown in dotted lines.
Figure 10:
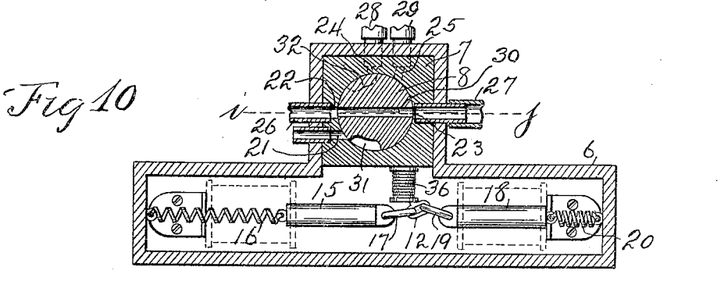
Fig. 10 is a view similar to that shown in Figs. 2 and 9, the magnetically-controlled valve being shown swung to the position in which the triple valve is cut out and the auxiliary reservoir connected directly with the brake-cylinder.
Figure 11:
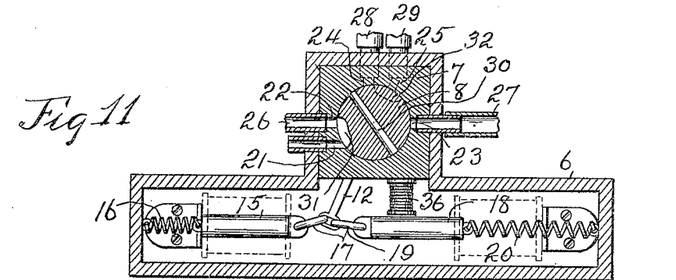
Fig. 11 is a view similar to that shown in Figs. 2, 9, and 10, the magnetically-controlled valve being shown swung to the position in which the triple valve and auxiliary reservoir are cut out and the brake-cylinder connected with the atmosphere for exhausting and relieving the brakes.
Figure 12:
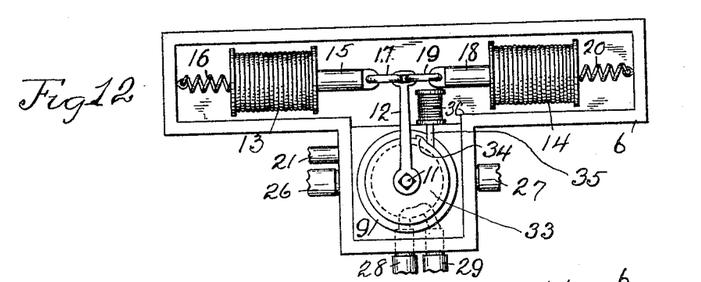
Fig. 12 is a bottom view of the magnetically-controlled valve mechanism shown in the preceding three figures, the bottom of the casing inclosing the said valve being removed and the parts shown in the positions corresponding to those in Fig. 2, in which the valve is in position for connecting the brake-cylinder and the triple valve.
Figure 14:
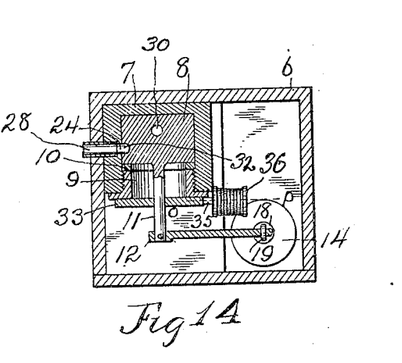
Fig. 14 is a vertical sectional view of the valve mechanism taken on the dotted line $mn$ of Fig. 2.

6 denotes a horizontal T-shaped casing secured to the under side of each car and in which the electrically-controlled valve mechanism is mounted. Within the casing 6 is the valve-casing 7, provided with a central vertical cylindrical recess in which is rotatively mounted and fitted thereto a cylindrical oscillatory valve 8, which valve controls the supply of air to and exhaust from the brake-cylinder. As shown in Fig. 14, the lower end of the recess in the casing 7 is screw-threaded and has mounted in it an externally-screw-threaded tubular bushing 9, upon the upper end of which is an annular packing-ring 10, which supports the valve 8. The lower end of the valve 8 is provided with a vertical stem 11, to the lower end of which is rigidly secured one end of a horizontal lever 12, by the swinging of which the valve 8 is oscillated. Disposed one at each side of the lever 12 are two solenoid-helices 13 and 14, respectively. In the helix 13 is a longitudinally-movable core 15, to the outer end of which is secured one end of a spring 16, the other end of which is secured to the casing. The other end of the core is pivotally connected, by means of a link 17, with the lever 12. In the other helix 14 is a longitudinally-movable core 18, one end of which is connected, by means of a link 19, with the lever 12, the other end of which is connected to one end of a spring 20, the other end of which is connected to the casing 6. The function of the springs 16 and 20 is to normally retain the valve in the central position. (Shown in Fig. 2 and Fig. 12.) The casings 6 and 7 are provided with the transverse holes 21, 22, 23, 24, and 25, which extend through to the central vertical opening in the valve-casing 8 and serve as ports by which the passage of air to and from the brake-cylinder may be controlled by the valve 8. The port 21 leads to the atmosphere outside the casing 6. The port 22 has connected to it the conductor 26, leading to the brake-cylinder. The port 23 has a conductor 27, connecting the said port with the auxiliary reservoir 2. The port 24 has a conductor 28, connecting it with the conductor 26. The port 25 is connected by conductor 29 with the triple valve. Through the valve 8 extends diametrically an air-passage 30, which connects the ports 22 and 23 when the valve 8 is swung to the position shown in Fig. 10. In this position the valve 8 connects the brake-cylinder 1 directly with the auxiliary reservoir 2, the other ports being closed. In the periphery of the valve 8 is a recess 31, so disposed that when the valve 8 is swung to the position shown in Fig. 11 the recess 31 will connect ports 21 and 22, thus connecting the brake-cylinder 1 by means of the conductor 26 through the said ports with the atmosphere and permitting the exhausting of air from the brake-cylinder. At another point on the periphery of the valve 8 is another recess 32, so disposed on the valve 8 as to connect the ports 24 and 25, thus connecting the triple valve with the brake-cylinder by means of the conductors 26, 28, and 29 when the valve 8 is in the position shown in Figs. 2 and 7. In this position all the other ports are closed. Normally the valve 8 is in the position shown in Figs. 2 and 7, being held in such position by means of the retracting-springs 16 and 20 and the cores 15 and 18, links 17 and 19, and lever 12. In this position the brakes may be operated in the ordinary manner by means of the triple valve 3. If it is desired to more quickly actuate the brake-cylinder or in the event of the inoperativeness of the triple valve, the helix 14 is energized in the manner hereinafter described, thus drawing in the core 18 and swinging the valve 8 by means of the link 19 to the position shown in Figs. 8 and 10, thus connecting, as already described, the brake-cylinder 1 with the reservoir 2, permitting the air to pass from the reservoir, through the pipes 26 and 27 and passage 30, into the brake-cylinder.

Figure 13:
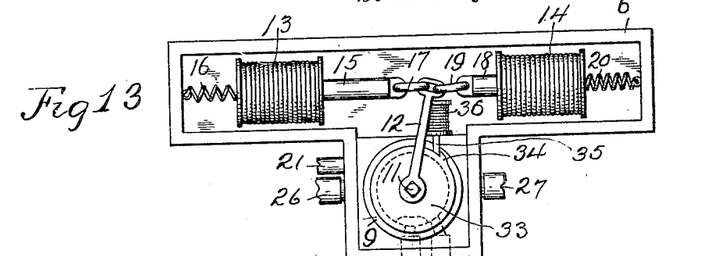
Fig. 13 is a similar view to that represented in Fig. 12, the parts being shown in positions corresponding to those represented in Fig. 9, in which the magnetically-controlled locking mechanism has prevented the retraction of the valve to its normal position.
Figure 15:
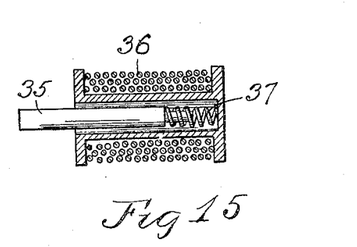
Fig. 15 is a longitudinal sectional view of the solenoid controlling the valve-locking mechanism, taken on the dotted line $op$ of Fig. 14.

If it is desired to retain the pressure in the brake-cylinder after the helix 14 has been deenergized, the following locking mechanism is provided for preventing full retraction of the valve 8 to a position in which the brake-cylinder can be connected with the air. On the stem 11 of the valve 8 (best shown in Figs. 12, 13, and 14) is mounted rotatively with the stem a disk 33, provided with a peripheral ratchet-tooth 34, adapted to be engaged by a horizontal pawl 35, forming a longitudinally-movable core in the helix 36, supported by the valve-casing 7. The tooth 34 and the pawl 35 are so disposed that when the pawl 35 is forced against the periphery of the disk 33 the pawl will engage the tooth 34 and hold the valve 8 in the position shown in Fig. 9, in which all the ports of the valve are closed and the valve prevented from being retracted to the normal position. (Shown in Fig. 2.) A spring 37, as shown in Fig. 15, is mounted upon the reduced inner end of the pawl 35 and bears one end upon said pawl and the other upon the closed end of the helix 36. The tension of the spring 37 is such that the pawl 35 is normally held in contact with the disk 33.

Figure 4:
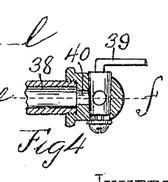
Fig. 4 is a vertical sectional view taken on the dotted line $cd$ of Fig. 2.
Figure 6:
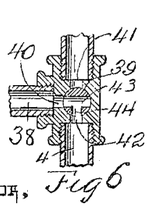
Fig. 6 is a horizontal sectional view taken on the dotted line $ef$ of Fig. 4.

When it is desired to exhaust the brake-cylinder, the helices 13 and 36, which are preferably located in the same circuit, are energized in the manner hereinafter described, thus withdrawing the core 15 and the pawl 35 into their respective helices 13 and 36. The valve 8 being released from the pawl 35 is drawn, by means of the core 15, link 17, and lever 12, to the position shown in Fig. 11, in which position, as already described, the brake-cylinder can exhaust into the atmosphere through conductors 26, ports 21 and 22, and recess 31. If it is desired then to bring the valve to the normal position (shown in Fig. 2 and connecting the triple valve 3 with the brake-cylinder 21) the helix 13 is deenergized, after which the springs 16 and 20, being of equal strength, will swing the valve 8, as already described, to the normal position. (Shown in Figs. 2 and 12.) Sometimes the triple valve 3 becomes inoperative by means of the parts being gummed or water collecting in the valve being frozen. To obviate this, I provide a by-pass connecting the train-pipe 4 with the conductor 27. This by-pass comprises a conductor 38, connected at one end to the conductor 27 and at the other end to the casing of a valve 39. (Best shown in Figs. 4 and 6.) The casing of the valve 39 is provided with a vertical cylindrical opening, in which the valve is rotatively mounted, the said vertical opening being provided with a lateral port 40, connecting with the conductor 38, and two ports 41 and 42, connecting, respectively, the triple valve and the train-pipe. The valve 39 is provided with a transverse passage 43, adapted to be connected with the ports 41 and 42 or with the port 40 when the valve is properly positioned. The passage 44 extends transversely from one side of the valve 39 and intersects the passage 43. When it is desired to connect the auxiliary reservoir 2 with the train-pipe 4 through the triple valve 3, the valve 39 is swung so that the passage 43 registers with the ports 41 and 42, the port 40 being closed. When it is desired to cut out the triple valve by way of the by-pass 38, the valve 39 is swung to the position shown in Figs. 2, 4, and 6. In this position the passage 44 connects with the train-pipe 4 through the port 42, and the passage 43 is connected with the port 40, the port 41 being closed. The air will then pass from train-pipe 4 through port 42, passages 43 and 44, port 40, conductor 38, and an ordinary check-valve A, located in and forming part of the conductor 38, through the conductor 27 into the auxiliary reservoir 2. When the parts are so disposed, air may be supplied to the reservoir 2 in the ordinary manner. The check-valve A is an ordinary check-valve, which permits passage from the conductor 38 into the conductor 27, but prevents backflow through the conductor 38, so that the air from the reservoir will not escape in the event of a reduction in the pressure of the train-pipe. The brakes, however, may be set and released by the engineer through the intermediacy of the valve 8.

Figures 16, 17, 18, 19, 20, 21, 22:
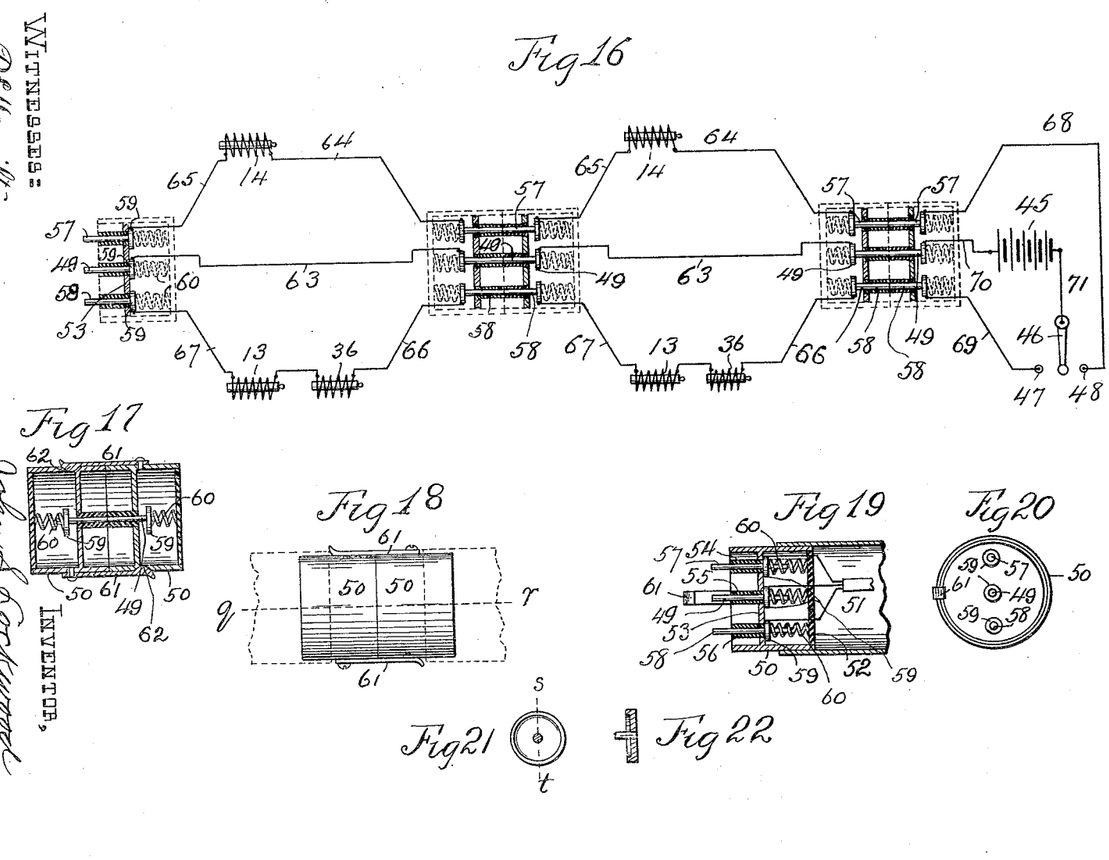
Fig. 16 is a diagrammatic view of the electrical circuits for controlling the operation of the magnetically-actuated valve.
Fig. 17 is a vertical longitudinal sectional view, taken on the dotted line $q\ r$ of Fig. 18, of two coupling members used to connect the circuits between the cars.
Fig. 18 is a plan view of the coupling parts shown in Fig. 17.
Fig. 19 is a vertical sectional view of one member of a coupling.
Fig. 20 is an outer end elevation of the same.
Fig. 21 is an end elevation of one of the coupling contact-pins, the stem of which is shown in cross-section.
Fig. 22 is a cross-section taken on the dotted line $s\ t$ of Fig. 21.

I will now describe the mechanism by which the helices 13, 14, and 36 are energized. On the engine or at any suitable place is provided an electrical generator, comprising, preferably, an electrical battery 45, one pole of which is connected with a switch-lever 46, (shown in Fig. 16,) adapted to be connected, respectively, with the contacts 47 or 48. The other end of the battery 45 is connected with the central slidable contact-pin 49, with which one member 50 of a coupling is provided. The engine and each end of each car is provided with a coupling member 50, adapted to engage with any other suitable coupling member. This coupling member comprises a tube 50, the inner end of which is mounted in a hose 51, with which each car is provided and in which the circuit-wires are mounted. Within the tube 50 is a transverse partition 52, which closes the inner end of the tube 50. Near the outer end in the tube 50 is a transverse partition 53, provided with three transverse holes disposed one above the other in a vertical plane and having mounted insulating guiding-tubes 54, 55, and 56, disposed horizontally lengthwise in the tube 50, and in which are respectively mounted horizontal sliding contact-pins 57, 49, and 58. Each of the said pins 57, 49, and 58 is provided with a flange 59, normally held in electrical contact with the metallic partition 43 by means of a spring 60, one end of which bears against the said flange and the other against the head or partition 52. When in this position the outer ends of the pins extend beyond the outer end of the tube 50 and are adapted to be forced inwardly, as shown in Fig. 17, by the corresponding pins of another coupling member when two coupling members are united, as shown in Figs. 17 and 18. In this position the pins are prevented from contact with the metallic portion of the coupling by the insulating-tubes 54, 55, and 56, the head 52 of the coupling being made also of insulating material. Upon each side of each coupling 50 is provided a spring-tongue 61, secured at one end to the body of the member, the free end of the tongue being provided with an inwardly-extending projection adapted to enter a corresponding recess in the wall of the opposite coupling member. The tension of the tongues 61 of the coupling is such that the outer ends of the members may be slipped together and held united by the projection 62 entering the said recesses. An insulated wire 63 has its ends connected, respectively, to the two central pins 49 of the two coupling members on the car. A wire 64 on each car connects at one end with one end of the helix 14 and at the other end with the pin 57 at one end of the car. The other end of the helix 14 is connected by a wire 65 with the other pin 57 on the same car. One end of each helix 36 on each car is connected with one end of the helix 13, the other end of the helix 36 being connected by a wire 66 with the pin 58 at one end of the car. The other end of the helix 13 is connected by a wire 67 with the pin 58 at the other end of the car. On the engine the pin 57 is connected by a wire 68 with the contact 48, the pin 58 on the engine being connected by a wire 69 with the contact 47, a wire 70 connecting the pin 49 of the engine with one pole of the battery, the other pole being connected by a wire 71 with the switch-lever 46. As shown in Fig. 16, the adjacent coupling members of the different cars and engines are united, thus causing the corresponding pins 57, 49, and 58 of each coupling to make electrical contact with each other, respectively. The pins 57, 49, and 58 of the last car are forced by their respective springs 60 into a position in which the heads or flanges 59 of said pins complete the circuit through the contact plate or partition 53. The magnets 13, 14, and 36 are energized as follows, the adjacent coupling members having been united as above described: If the engineer wishes to connect the brake-cylinder with the reservoir 2 independently of the triple valve 3, he throws the switch 46 so it will connect with the contact 48. The circuit will then be completed from the battery 45 by means of line-wire 71, switch 46, contact 48, wire 68, pins 57, wire 64, helix 14, wire 65, pins 57, wire 64, helix 14, wire 65, pin 57 of the last car and through the intermediacy of the head 59 of the said pin with contact-partition 53, thence by way of the head 59 of the pin 49 to wire 63, pins 49, wire 63 of the next car forward, pins 49, and by wire 70 with the other pole of the battery 45. This circuit when so completed energizes all of the coils 14, thus swinging the valve 8 to the position shown in Fig. 10 and applying the brakes without intervention of the triple valve 3, as already described. If he desires now to release the brakes, he throws the switch 46 over contact 47. The current from the battery 45 will then traverse wire 71, switch-lever 46, contact 47, wire 69 of the engine, adjacent pins 58, wire 66 of the next car, helices 13 and 36 of the same car, wire 67, thence through adjacent pins 58 to wire 66 of the last car, thence through helices 13 and 36, thence by wire 67, pin 59, and partition 53 to pin 49 of the last car, from which the current returns, as already described, to the other pole of the battery. The current in energizing helices 13 and 36 swings the valve 8, as already described, to the position shown in Fig. 11, thus connecting the interior of the brake-cylinder 1 with the atmosphere independently of the triple valve. To again connect the brake-cylinder with the triple valve, the engineer swings the switch-lever 46 to the position shown in Fig. 16, in which both circuits are open.

Various modifications of my invention may be resorted to without departing from its spirit.

Having thus described my invention, what I claim, and desire to secure by Letters Patent, is—

1. The combination with the brake-cylinder, auxiliary reservoir, train-pipe and triple valve connecting the train-pipe with the auxiliary reservoir, of an electrically-actuated valve provided with means for connecting the brake-cylinder with the triple valve, with the auxiliary reservoir independently of the triple valve, or with the atmosphere, and means by which the said electrically-actuated valve may be disposed so as to make the said connections.

2. The combination with the brake-cylinder, auxiliary reservoir, train-pipe and triple valve connecting the train-pipe with the auxiliary reservoir, of a valve provided with means for connecting the brake-cylinder with the triple valve, with the auxiliary reservoir independently of the triple valve, or with the atmosphere, and electromagnetic means for disposing the valve so as to make the said connections.

3. The combination with the brake-cylinder, auxiliary reservoir, train-pipe and triple valve connecting the train-pipe with the auxiliary reservoir, of an oscillatory valve provided with means when properly oscillated to connect the brake-cylinder with the triple valve, with the auxiliary reservoir independently of the triple valve, or with the atmosphere, and means for oscillating the said valve to positions suitable for making such connections.

4. The combination with the brake-cylinder, auxiliary reservoir, train-pipe and triple valve connecting the auxiliary reservoir with the train-pipe, of an oscillatory valve provided with means when properly oscillated to connect the brake-cylinder with the triple valve, with the auxiliary reservoir independently of the triple valve, or with the atmosphere, and electrically-actuated means for oscillating the said valve to positions suitable for making said connections.

5. The combination with the brake-cylinder, auxiliary reservoir, train-pipe and triple valve connecting the train-pipe with the auxiliary reservoir, of a valve provided with means when moved to the proper positions for connecting the brake-cylinder with the triple valve, with the auxiliary reservoir independently of the triple valve, or with the atmosphere, means for moving said valve to the said positions, and means for cutting out the triple valve and connecting the auxiliary reservoir with the train-pipe independently of the triple valve.

6. The combination with the brake-cylinder, auxiliary reservoir, train-pipe and triple valve connecting the train-pipe with the auxiliary reservoir, of a valve provided with means when moved to the proper positions for connecting the brake-cylinder with the triple valve, with the auxiliary reservoir independently of the triple valve, or with the atmosphere, electrically-actuated means for moving the said valve to the said positions, and means for connecting the auxiliary reservoir with the train-pipe independently of the triple valve.

7. The combination with the brake-cylinder, auxiliary reservoir, train-pipe, and triple valve connecting the train-pipe and the auxiliary reservoir, of a valve provided with means when moved to the proper positions for connecting the brake-cylinder with the triple valve, with the auxiliary reservoir independently of the triple valve, or with the atmosphere, means for moving the said valve to the said positions, a passage connecting the train-pipe with the auxiliary reservoir around the triple valve, a valve for disconnecting the triple valve with the train-pipe and connecting the train-pipe with the said passage, and a check-valve for preventing backflow from said passage into the train-pipe.

8. The combination with the brake-cylinder, auxiliary reservoir, train-pipe, and triple valve connecting the train-pipe with the auxiliary reservoir, of a valve provided with means when moved to the proper positions for connecting the brake-cylinder with the triple valve, with the auxiliary reservoir independently of the triple valve, or with the atmosphere, electromagnetic means for moving the said valve to the said positions, suitable circuits connected with said electromagnetic means, and means for generating electric currents in said circuits for actuating the said electromagnetic means.

9. The combination with the brake-cylinder, auxiliary reservoir, train-pipe, and triple valve connecting the train-pipe with the auxiliary reservoir, of a valve provided with means for connecting the brake-cylinder with the triple valve, with the auxiliary reservoir, or with the atmosphere, when moved to the proper positions, means for so moving the said valve, and releasable locking means for holding the valve in position in which exhaust from the brake-cylinder is prevented.

10. The combination with the brake-cylinder, auxiliary reservoir, train-pipe, and triple valve connecting the train-pipe with the auxiliary reservoir, of a valve provided with means for connecting the brake-cylinder with the triple valve, with the auxiliary reservoir independently of the triple valve, or with the atmosphere, electrically-actuated means for positioning the said valve to make said connections, and means for locking the valve in position in which exhaust from the brake-cylinder is prevented after the brake-cylinder has been charged from the auxiliary reservoir, and electrically-actuated means for releasing the valve from the said locking means.

11. The combination with the brake-cylinder, auxiliary reservoir, train-pipe, and triple valve connecting the train-pipe with the auxiliary reservoir, of a valve provided with means when properly moved for connecting the brake-cylinder with the triple valve, with the auxiliary reservoir independently of the triple valve, or with the atmosphere, means for normally holding the valve in position for connecting the brake-cylinder and the triple valve, electrically-actuated means for moving the valve in one direction for connecting the brake-cylinder directly with the auxiliary reservoir, means for retracting the valve in the opposite direction to a position for connecting the brake-cylinder with the atmosphere by way of the valve, and electrically-actuated locking means for preventing retraction of the valve to its normal position operative after the valve has connected the auxiliary reservoir and the brake-cylinder and then disconnected the same.

12. The combination with the brake-cylinder, auxiliary reservoir, train-pipe, and triple valve connecting the train-pipe and the auxiliary reservoir, of a valve provided with means when properly moved for connecting the brake-cylinder with the triple valve, with the auxiliary reservoir independently of the triple valve, or with the atmosphere, an arm on the valve for oscillating the same, two electromagnets provided with means for swinging said arm in opposite directions when the magnets are energized one at a time, means for energizing said magnets, and means for normally bringing the valve to a position in which the brake-cylinder will be connected by the valve with the triple valve.

13. The combination with the brake-cylinder, auxiliary reservoir, train-pipe, and triple valve connecting the train-pipe and the auxiliary reservoir, of a valve provided with means when properly moved for connecting the brake-cylinder with the triple valve, with the auxiliary reservoir independently of the triple valve, or with the atmosphere, the valve being provided with an arm for swinging the same, two electromagnets disposed on opposite sides of the arm, two magnetizable bodies connected to the arm and movable respectively by the magnets for the purpose when the arm is moved in one direction to connect the brake-cylinder with the auxiliary reservoir, and when moved in the other direction to connect the brake-cylinder with the atmosphere for the purpose of exhausting the cylinder, and means for normally forcing the valve to a position in which the brake-cylinder and triple valve will be connected.

14. The combination with the brake-cylinder, auxiliary reservoir, train-pipe, and triple valve connecting the train-pipe with the auxiliary reservoir, of a valve provided with means when properly moved for connecting the brake-cylinder with the triple valve, with the auxiliary reservoir, or with the atmosphere, the valve being provided with an arm for swinging the same, two solenoids disposed one at each side of the said arm the cores of which are connected with said arm, two links forming such connection between the arm and the said cores, a locking device for preventing movement of the arm in one direction, an electromagnet controlling said locking device, means for energizing said electromagnet and said solenoids, and means for normally forcing the valve to a position connecting the brake-cylinder and the triple valve, the solenoids serving to move the valve to the other two positions.

15. In an air-brake, the combination with the brake-cylinder, the auxiliary reservoir, and the triple valve, of a valve-casing provided with suitable ports and connections connecting the ports with the brake-cylinder, the auxiliary reservoir, the triple valve and the atmosphere, an oscillatory valve mounted in said casing and provided with suitable passages for connecting respectively the atmosphere-port and one of the ports leading to the brake-cylinder, the port leading to the auxiliary reservoir and the said brake-cylinder port, the port leading to the triple valve and the other port leading to the brake-cylinder, and means by which the said valve may be oscillated to positions suitable for making such connections.

16. In an air-brake, the combination with the brake-cylinder, the auxiliary reservoir, and the triple valve, of a valve-casing provided with two ports leading to the brake-cylinder, a port leading to the atmosphere, a port leading to the auxiliary reservoir and a port leading to the triple valve, suitable conductors connecting said ports with the brake-cylinder, auxiliary reservoir and triple valve, a movable valve provided with passages disposed when the valve is properly positioned, for connecting the port leading to the atmosphere with one of the ports leading to the brake-cylinder, the said port leading to the brake-cylinder and the port leading to the auxiliary reservoir, the other port leading to the brake-cylinder and the port leading to the triple valve, and electrical means for so positioning the said valve.

17. In an air-brake, the combination with the brake-cylinder, the auxiliary reservoir, and the triple valve, of a valve-casing provided with two ports leading to the brake-cylinder and ports leading respectively to the auxiliary reservoir, triple valve and atmosphere, and having suitable conductors connecting said ports with said brake-cylinder, reservoir and triple valve, an oscillatory valve mounted in said valve-casing and provided with a passage adapted to register with and connect one of the ports leading to the brake-cylinder with the port leading to the auxiliary reservoir, and having a passage for connecting the other port leading to the brake-cylinder with the port leading to the triple valve, and having also a passage for connecting one of the ports leading to the brake-cylinder with the port leading to the atmosphere, and electrical means for positioning the said valve so that the said ports may be consecutively connected as described.

18. In an air-brake, the combination with an oscillatory valve having suitable air-passages, of a casing in which said valve is mounted provided with suitable ports adapted, when the valve is properly positioned, to be connected by said air-passages, of two solenoids each provided with a core and a helix, means for energizing said helices, and moving the cores thereof, means by which when one helix is energized its core will oscillate the valve in one direction and when the other helix is energized its core will oscillate the valve in the other direction, means for retaining the valve in a normal central position, releasable locking means for preventing retraction of the valve to the said normal position after it has been moved to and partly retracted from a given position, and electromagnetic means for releasing the valve from the said locking mechanism.

19. The combination with a valve-casing provided with suitable ports, of the valve having suitable passages for connecting certain of said ports and provided with a crank-arm and rotatively mounted in said valve-casing, two helices disposed one at each side of said crank-arm, means magnetizable by said helices, movable thereby in opposite directions, means connected with said magnetizable means and said crank-arm for moving the crank-arm, and electrically-controlled means for preventing movement of the valve in one direction from a certain position.

20. The combination with an oscillatory valve provided with suitable air-passages and having a casing provided with suitable ports adapted to register with certain of said air-passages when the valve is moved to the proper positions, and having also a lever for oscillating said valve, a magnetizable core provided with means for locking the valve against movement in one direction, a helix for moving the said core in one direction, means for moving the core in the opposite direction, two helices, means for energizing the same, means when one of said two helices is energized for moving the lever in one direction, means for moving the lever in the opposite direction when the other of said two helices
5 is energized, and means for retracting said lever to a central position.

In testimony whereof I have signed my name to this specification in the presence of two subscribing witnesses.

JOHN S. LOCKWOOD.

Witnesses:
    WARREN D. HOUSE,
    R. E. HAMILTON.